United States Patent [19]

Duchet et al.

[11] Patent Number: 4,683,448
[45] Date of Patent: Jul. 28, 1987

[54] HIGH SENSITIVITY INTERFERENTIAL ELECTRO-OPTICAL MODULATOR

[75] Inventors: Christian Duchet, Marcoussis; René Martin, Massy, both of France

[73] Assignee: Compagnie Generale D'Electricite, Paris, France

[21] Appl. No.: 689,902

[22] Filed: Jan. 9, 1985

[30] Foreign Application Priority Data

Jan. 18, 1984 [FR] France ............................. 84 00734

[51] Int. Cl.[4] ............................. H01S 1/00; G02B 5/14
[52] U.S. Cl. ............................. 332/7.51; 350/96.14; 367/131; 367/134
[58] Field of Search ............. 350/96.14; 332/7.51; 367/131–134

[56] References Cited

U.S. PATENT DOCUMENTS

| | | | |
|---|---|---|---|
| 3,877,781 | 4/1975 | Kaminow | 350/96.14 |
| 4,008,947 | 2/1977 | Baues et al. | 350/96.14 |
| 4,056,304 | 11/1977 | Phillips | 350/96.14 |
| 4,070,094 | 1/1978 | Martin | 350/96.14 |
| 4,102,579 | 7/1978 | Stewart | 350/96.14 |
| 4,264,125 | 4/1981 | Shibata | 350/96.14 |
| 4,288,785 | 9/1981 | Papuchon et al. | 350/96.14 |
| 4,300,814 | 11/1981 | Carynco | 350/96.14 |
| 4,340,272 | 7/1982 | Papuchon et al. | 350/96.14 |
| 4,381,139 | 4/1983 | Alferness | 350/96.14 |
| 4,533,207 | 8/1985 | Alferness | 350/96.14 |

FOREIGN PATENT DOCUMENTS

| | | |
|---|---|---|
| 7913194 | 5/1979 | France . |
| 0710571 | 10/1980 | France . |
| 2508754 | 6/1981 | France . |

OTHER PUBLICATIONS

Applied Physics Letters vol. 33, No. 11, pp. 944–947, Dec. 1978.

Primary Examiner—Salvatore Cangialosi
Attorney, Agent, or Firm—Sughrue, Mion, Zinn, Macpeak and Seas

[57] ABSTRACT

High sensitivity interferential electro-optical modulator. The invention concerns an interferential electro-optical modulator. This modulator contains a Mach-Zehnder integrated interferometer in which each interferometer arm (24, 26) is overlapped by an electrode (40, 42), itself surrounded by two lateral electrodes (44, 46, 48, 50) to uniformize the electrical field crossing through each arm perpendicular to the face of the electro-optical crystall on which it is formed. Application to the detection of accoustic waves and low voltage measurement.

5 Claims, 4 Drawing Figures

HIGH SENSITIVITY INTERFERENTIAL ELECTRO-OPTICAL MODULATOR

This invention concerns an integrated electro-optical modulator.

BACKGROUND OF THE INVENTION

A Mach-Zehnder type modulator produced with guided optics, is described in R. Keil and F. Auracher's article (Siemens Forsh-u. Entwickl-Ber. Bd. 9 (1980) Nr 1) "Mach-Wehnder Waveguide Modulators in Ti-Diffused $LiNbO_3$". It consists of:

(a) a platelet of transparent crystalline material whose optical index varies by electro-optical effect under the action of an electrical field, (b) integrated optical guides, these guides being formed in one face of this platelet by permanent localized increases of the optical index resulting from doping of the material, these guides being monomode both as to their width and to their thickness and format, (c) an input guide receiving and conducting a light with a space coherence, (d) an input optical junction in Y to separate the light of the input guide into two beams of the same intensity, (e) two interferometric arms of similar length to conduct the two beams thus separated, these two arms extending parallel to each other in a longitudinal direction, (f) an optical output junction in Y to recombine these two beams from the two arms, (g) and an output guide receiving the light thus recombined and transmitting it on output from the modulator, the length of this guide being sufficient for it to only transmit its fundamental mode, (h) the modulator also containing electrodes formed on the said face of the platelet, associated to the two interferometric arms, and receiving an electrical modulation signal to apply to the material of its two arms, two electrical fields varying the optical length of these two arms in opposite directions and thus modulating the intensity of the light transmitted by the output guide, these electrodes extending along the said longitudinal direction over practically the whole length of the arms to increase the sensitivity of the modulator.

The optical guide (or integrated optics) obtains very high speed modulators (large pass-bands) with reasonable control voltages (a few volts). But the known modulators do not have as great a sensitivity as would be sometimes required, i.e., the degree of light modulation obtained with a low electrical control voltage is insufficient. It can be observed that, to a certain extent, there is incompatability between the sensitivity and the speed; the more modulator needs to be sensitive, the longer should be the electrodes and the higher the electrical capacilance entailing a reduction in the pass-band.

The most suitable material to produce an electro-optical modulator is lithium niobate ($LiNbO_3$) because it enables the production of good optical guides and is highly electro-optical. The light guides are obtained on a face of a monocrystalline platelet, this face being perpendicular to crystalline axis 3 also referred to as axis Z, at a polarized light is used along this axis, i.e., the optical electrical field is parallel to this axis. The electrical modulation field applied is also parallel to this axis.

Interferometers of this type are known for example through document FR-A No. 2 457 505, and by a paper read to the second European Conference on Integrated Optics (17–18 October 1983 Florence, IEE Number 227 "Linear Mach-WehnderInterferometers in $LiNbO_3$ for Electromagnetic Field Sensing" C. H. Bulmer, R. P. Loeller and W. K. Burns, Naval Research Laboratory, Washington, D. C. 20375, USA).

In these known modulators one of the electrodes associated with each of the arms is an overlapping electrode which overlaps this arm so that the electrical field applied to this arm is practically perpendicular to the said face of the platelet, the other electrodes being lateral electrodes formed at a lateral distance from these arms.

Moreover, to increase the sensitivity, these documents indicate that the electrodes are extended as far as their input and output junction areas in Y.

It is moreover known, in a similar technical field, through an article by Al Ferness and others "High-Speed, Low Loss, Low-Drive-Power Travelling-Wave Optical Modulator for Lambda=1.32 Micron" (Electronic Letters, Apr. 12, 1984, Vol. 20 No. 8 Page 354) how to lower the control power of a directional optical coupler to five volts by reducing the size of the guided mode in an optical guide, i.e., the width of this guide. The aim is to reduce the spacing between two parallel guides overlapped by two control electrodes, to obtain the correct electrical control field by applying a reduced electric voltage between these electrodes.

The sensitivities obtained nevertheless remain less than might be desired, notably in the case in which a modulator is used to obtain a hydrophone in association with a piezoelectric tranducer, or for that of a device measuring low electric voltages, for example of around a few tenths of a volt.

The aim of this invention is to produce an interferential electrooptical modulator, offering increased sensitivity whilst preserving a large passband at a reasonable cost price.

SUMMARY OF THE INVENTION

The modulator, according to the invention, contains an integrated Mach-Zehnder interferometer with overlapping electrodes as known from the documents referred to initially. It is featured by the fact that it contains six of the said electrodes, each arm being associated with three electrodes which are an overlapping electrodes fitted between two lateral electrodes, the modulation signal being applied first between this overlapping electrode and secondly these two lateral electrodes, so that the electrical field applied to this arm is made uniformly sensitive over the whole of its width.

This still further increases the sensitivity of the modulator, but requires the presence of two "internal" lateral electrodes, i.e., fitted between the two arms. This obviously displays between these arms an additional spurious capacity which reduces the passband, this capacity is all the greater when the electrodes are closer. Now the lateral spacing of these arms should not be selected much greater than the value required to avoid spurious optical coupling between the two arms. Unnecessarily large spacing would in fact have two drawbacks: it would display between the arms differences in temperature capable of creating a spurious modulation. At it would increase the dimensions and price of the crystalline platelet . It has however appeared possible to the inventor to limit these drawbacks to a perfectly acceptable level firstly by a correct choice of the spacings, secondly by installing the platelet in a known type of mechanically and thermally protected housing. As for the increased number of electrodes this does not entail any appreciable production cost supplement when a conventional photolithographic processor is used.

The following arrangements are preferably employed:

(a) each of the said overlapping electrodes protrudes laterally from the two sides of the associated arm so as to make the electrical field still more uniform over the width of this arm.

(b) in the case of a hydrophone the optical lengths of the two interferometer arms in the absence of an electrical field, differ by about one quarter of the wave-length of the light from the said source, the said electrodes being arranged so as to apply to the two interferometer arms electrical fields in opposite directions to produce variations in the optical index in opposite directions in the crystalline material which they consist of.

(c) the length of action of these electrodes on each of these two arms is more than one centimeter so as to obtain greater sensitivity.

(d) the distance between these two arms is more than five times the width of the arms to prevent spurious optical coupling between two arms, and at the same time it is fifty micrometers less so as to avoid temperatures between these two arms.

(e) the interval between the internal lateral electrodes fitted between the two arms and associated respectively to these two arms is greater than that between each of these electrodes and the associated arm, so as to reduce the capacitance of the modulator and increase its frequency passband.

It can be observed that the article published in Applied Physics Letters, Vol. 33, No. 11, December 1978, Pages 944-947, by W. K. Burns, and others: "Interferometric waveguide modulator with polarization independent operation" shows, in the right hand part of FIG. 1, a vertical field interferometric device, and at first sight one may wonder if a "vertical" field applied to an arm is not made practically uniform over the whole width of the arm, by the fact that the overlapping electrode is surrounded by two lateral electrodes, even if only one of these lateral electrodes is specific to this arm. In fact, the distance between the overlapping electrode and the lateral electrodes specific to this arm appears comparable to that between the electrodes overlapping the two arms which, for one arm, which shows the electrode overlapping the other arm symmetrical to the lateral electrode. In fact this appearance does not correspond to the facts because a distance of a few tens of microns is necessary between the two arms a few microns wide, the ratio between this distance and this width should be around five to ten, to prevent spurious optical coupling between the two arms. This distance prevents the electrode overlapping an arm to play the part of lateral electrode to make the electrical field symmetrical.

Using the diagrammatical figures appended, we shall describe below, not exhaustively, how the invention can be implemented.

DESCRIPTION OF THE PREFERRED EMBODIMENT

Figure 1:
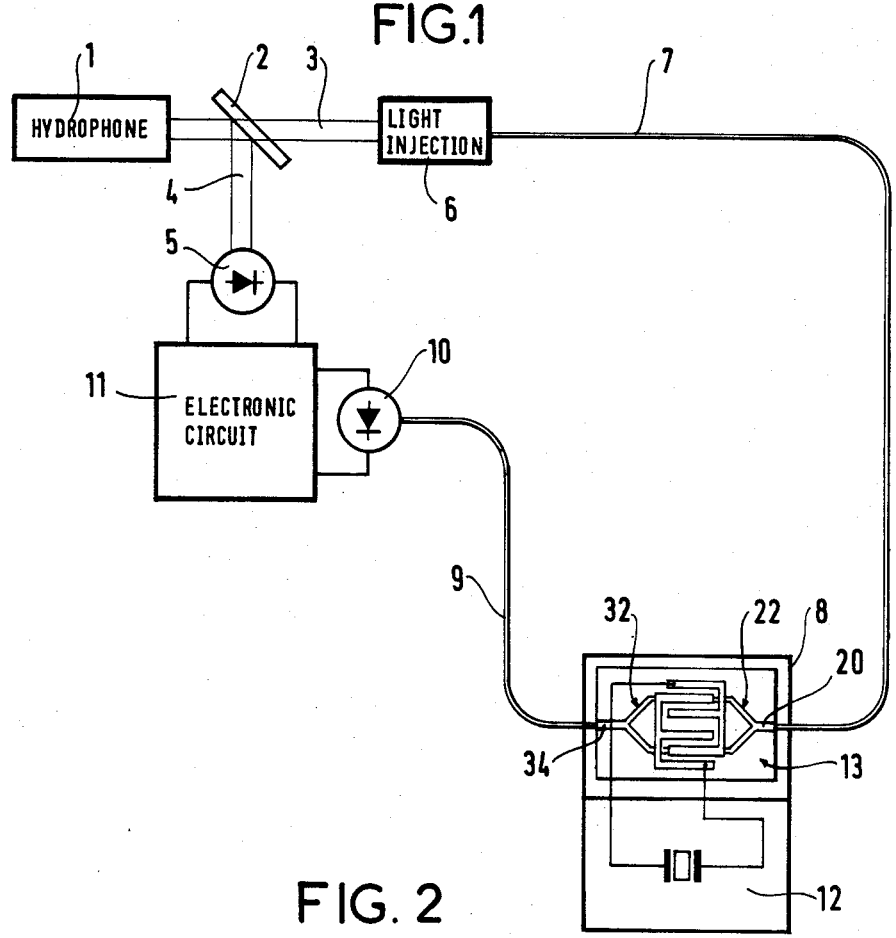
FIG. 1 shows a general view of a hydrophone containing a modulator according to the invention.
Figure 2:
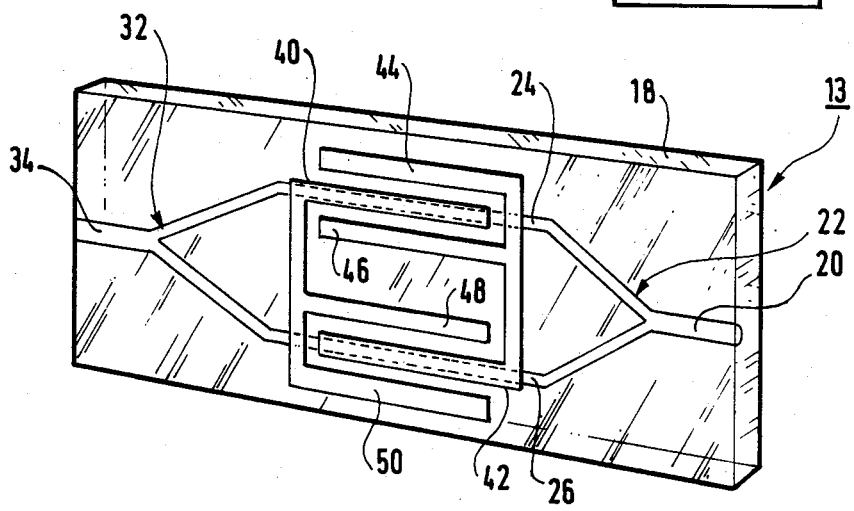
FIG. 2 shows a perspective view of the modulator of this hydrophone.
Figure 3:
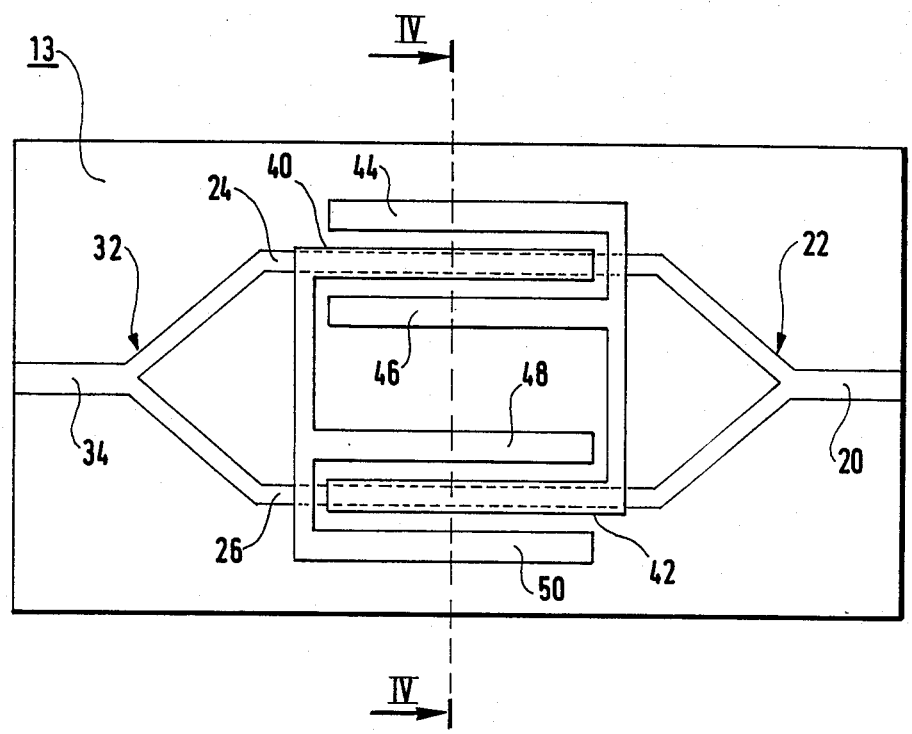
FIGS. 3 and 4 show respectively a top view and cross-sectional view of this modulator.
Figure 4:
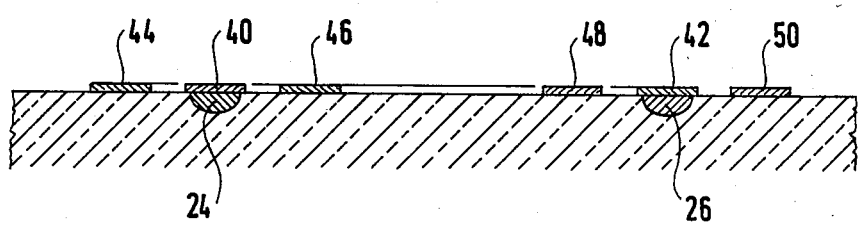

The hydrophone contains:

(a) a space-coherence source 1

(b) a separator segment 2 dividing the initial beam into two beams 3 and 4. Beam 4 arrives on a reference photodetector 5 and has a far lower intensity (a hundred times lower) than that of beam 3. It is only used as reference to eliminate the disturbances due to the source's fluctuation in intensity.

(c) a light injection system 6

(d) a unimode outgoing fibre 7

(e) an immersed, passive accoustic sensor 8 receiving the light and modulating it according to the accoustic waves it receives (f) a unimode or multimode return fibre 9

(g) a reception photodetector 10

(h) an electronic circuit 11 eliminating the fluctuations intensity of source 1 and supplying a signal representative of the accoustic waves received by the sensor, for this purpose this circuit receiving the output signals from photodetectors 5 and 10.

The immersed passive accoustic sensor 8 consists of:

(a) a piezoelectric transducer 12 receiving the accoustic waves and supplying an electric modulation signal (b) an electro-optical modulator 13 receiving this electrical modulation signal and modulating the light conveyed by the outgoing fibre. This modulator 13 is produced according to this invention.

It contains a platelet 18 consisting of transparent material whose optical index varies through electro-optical effect under the action of an electric field created by the electrical modulation signal, and optical guide monomode both as to their width and thicknesses i.e.,:

(a) an input guide 20 receiving the light conveyed by the outgoing fibre (b) an optical input junction in Y form 22 to separate the light from the input guide into two beams of the same intensity (c) two interferometer arms, 24, 26 conducting the two beams thus separated which undergo a variation in optical length under the action of the electrical modulation signal. These two arms have a difference in optical length of about a quarter of the wavelength to maximize the sensitivity of the interferometer and provide linear variation in intensity depending on the weak electrical modulation signal. Electrodes are deposited on the useful face of the platelet on the two arms to apply an electrical field to them created by the electrical transducing signal and which induces a variation in the optical index. The electrical field lines close through the inside of the platelet and the directions of the field are opposite in the two arms, which induces index variations of opposite directions.

(d) an optical output junction in Y form 32 to recombine the two beams from the two arms (e) an output guide 34 receiving the light thus recombined and transmitting to the return optical fibre. This output guide corresponds to a a sufficient length to only transmit the fundamental mode. According to the phase difference between the beams from the two arms and induced by the electrical signal from the transducer, the recombination supplies a fundamental mode of variable intensity.

More especially source 1 is an He-Ne laser emitting at 0.633 micrometer wavelength.

As for the monocrystalline platelet it consists of lithium niobate and is cut as previously indicated. Other materials can however be used, for example lithium tantalate.

According to this invention, the electrodes are two overlapping electrodes 40 and 42 on guides 24 and 26 and four lateral electrodes, i.e., 44 and 46 on either side of electrode 40, 48 and 50 on either side of electrode 42, the modulation signal being applied between, firstly the interconnected electrodes 40, 48, 50, and secondly the interconnected electrodes 42, 44, 46.

The longitudinal dimensions are as follows in millimeters:
electrodes: 22.8
interferometer arm: 23.2
branches of junctions in Y form: 2.005
platelet: 33.21.

The branches of the junctions in Y form make an angle at one degree.

The transverse dimensions are as follows, in micrometers:
electrodes: 5
interval between electrodes associated to the same arm: 3
interval between internal electrodes: 17, spacing between guide then being 38.

The width of the platelet is for example 2 mm but its thickness 0.5 mm.

The optical guides are produced conventionally by titanium diffusion from bands previously deposited with:
titanium thickness: 380 angstroems.
width of titanium bands: 3 micrometers
diffusion time: 5 hours
diffusion temperature: 980° C.

With these conditions the guides are monomode at wavelength of 6328 angstroems.

The electrodes are produced by conventional photolithographic processes and consist of gold on an underlayer of titanium.

As the optical wave is absorbed by the metal, a so-called "optical isolation" layer is interposed between the $LiNbO_3$ and the electrodes. This $SiO_2$ layer has a thickness of some 1,000 angstroems. This layer, not shown, can extend over the whole useful face of the niobate crystal.

The sensitivity is measured by the electric voltage VM which it is necessary to apply to change from maximum transmissions to minimum transmissions. The voltages VM normally used are of a few volts. With the structure described here, the voltage VM is 0.4 for the wavelength used.

The passband remains quite sufficient in numerious applications such as that as described above or for measuring low voltages. More precisely it is about 100 MHz.

Although a hydrophone is described above detecting accoustic waves propagating in water, it should be understood that the invention applies in the same way to pressure and various vibration measurement instruments. It can also apply to all measuring or detection instruments in which the phenomenon measured or detected is expressed by a very low power electric signal with voltage less than one volt approx.

What is claimed is:

1. High sensitivity, interferential electro-optical modulator including a modulator input and output comprising:
a Mach-Zehnder integrated type interferometer (13), said interferometer comprising:
a platelet (18) having a face and being of transparent crystalline material whose optical index varies by electro-optical effect under the action of an electrical field;
integrated input and output optical guides, said guides being formed in said face of said platelet through permanent localized increases in the optical index resulting from doping of the material, said guides being monomode both as to their width and thickness and format;
said input guide (20) receiving from said modulator input and conducting a light with space coherence;
an optical input junction in Y form integrated with said input guide and separating the light from the input guide into two beams of same intensity;
two interferometer arms (24, 26) integrated with said input junction and being of similar length conducting the two beams thus separated, said two arms extending parallel to each other in a longitudinal direction;
an optical junction in Y form (21) integrated with said interferometer arms to recombine the two beams from the two arms;
said output guide (34) integrated with said output junction and receiving the light thus recombined and transmitting it on output (9) from the modulator, the length of said output guide being such that it only transmits its fundamental mode;
said modulator further containing electrodes formed on said face of the platelet, associated with the two interferometer arms and means for applying an electrical modulation signal to the material of said two arms (24, 26) to create two electrical fields varying the optical length of said two arms in opposite directions thus modulating the intensity of the light transmitted by the output guide (34), said electrodes extending along said longitudinal direction over practically the whole length of the arms to increase the sensitivity of the modulator, one of the electrodes associated with each of said arms being an overlapping electrode which overlaps each said arm so that the electrical field applied to each said arm is practically perpendicular to said face of the platelet, the other electrodes being lateral electrodes formed at a lateral distance from said arms;
the improvement wherein said modulator contains six said electrodes, each arm being associated with three electrodes which are; an overlapping electrode fitted between two lateral electrodes, said modulation signal being aplied between firstly said overlapping electrode and secondly said two lateral electrodes so that the electric field applied to each arm is made practically uniform over the whole of its width to still further increase sensitivity of the modulator.

2. Modulator according to claim 1, wherein each of said overlapping electrodes protrudes laterally slightly beyond the two sides of each associated arm so as to make the electrical field more uniform over the whole width of each said arm.

3. Modulator according to claim 1, wherein the optical lengths of said interferometer arms (24, 26) in the absence of an electrical field, differs by about one quarter of the wavelength of the light from said source (1);

the length of action of said electrodes on each of said two arms being more than one centimeter so as to obtain greater sensitivey; and the distance between said two arms being less than fifty micrometers so as to avoid differences in temperature between said two arms.

4. Modulator according to claim 3, wherein the interval between the two internal lateral electrodes fitted between the two arms and associated respectively with said two arms, is greater than the interval between each of said electrodes and the associated arm, so as to reduce the capacitance of the modulator and increase its frequency passband.

5. Modulator according to claim 1, wherein said electrodes are installed to apply to the two interferometer arms (24, 26) electrical fields in opposite directions so as produce variations in the optical index of opposite directions in the crystalline material which they consist of.

* * * * *